United States Patent [19]

Hough et al.

[11] 4,394,044
[45] Jul. 19, 1983

[54] REMOVABLE SUNROOF FOR VEHICLES

[76] Inventors: Louis E. Hough, 22448 Statler, St. Clair Shores, Mich. 48081; Walter J. De Vigili, 16082 Dugan Rd., Roseville, Mich. 48066; David C. Shifflett, 19466 Highlight Dr., Clinton Township, Clinton County, Mich. 48043

[21] Appl. No.: 195,150

[22] Filed: Oct. 8, 1980

[51] Int. Cl.³ .............................................. B60J 7/00
[52] U.S. Cl. ..................... 296/218; 49/465; 98/2.14; 114/201 R
[58] Field of Search ............. 296/217 R, 137 B, 218, 296/216, 219, 221; 49/394, 465; 98/2.14; 292/DIG. 49, DIG. 5, 207; 114/201 R

[56] References Cited
U.S. PATENT DOCUMENTS

3,727,973  4/1973  Perks ................................. 296/217
3,972,558  8/1976  Horn .................................. 296/218
4,176,876  12/1979 Sorensen .......................... 296/217

Primary Examiner—Richard A. Bertsch
Attorney, Agent, or Firm—Krass, Young & Schivley

[57] ABSTRACT

A removable sunroof panel adapted to be mounted in overlying relationship in an opening in the roof of a vehicle includes front and rear mounting assemblies which allow either or both the front and rear of the panel to be held in an open position above the vehicle's roof. Each of the mounting assemblies includes a lever handle pivotally connected to the sunroof panel and a latching assembly for receiving and locking the lever handle in a plurality of positions. A frame molding mounted in the sunroof opening includes a first section overlying the roof, and second and third sections below the roof defining a channel for receiving a resilient seal against which the roof panel seats; the second and third sections include a pair of opposed grooves for captivating a pair of ribs in the seal to retain the seal in the channel. An air deflector mounted adjacent the leading edge of the sunroof opening in spaced relation to the leading edge and serves as a deflector for either directing air through the opening into the vehicle or preventing wind buffeting noise.

29 Claims, 14 Drawing Figures

REMOVABLE SUNROOF FOR VEHICLES

DESCRIPTION

1. Technical Field

The present invention generally relates to sunroofs for vehicles, and deals more particularly with mechanisms for removably mounting a sunroof panel in an opening of the vehicle's roof.

2. Background Art

Sunroofs for vehicles which may be manually moved from a vehicle's roof are well known in the art as evidenced by U.S. Pat. Nos. 3,913,971; 3,965,566; 4,067,605; 4,127,302; and 4,154,474. Generally, sunroofs of the type shown in the patents mentioned above are pivotally connected at their leading edge to the vehicle's roof and include a latching mechanism along the rear edge thereof which allows the rear of the panel to be elevated above the roof, thereby providing an opening along the rear of the panel which improves air circulation within the vehicle.

Latching mechanisms employed in prior art sunroofs were relatively complex in terms of the number of parts they employed because of the need to permit the user to shift the sunroof between an open, latched position and a closed, locked pisition in a single motion using only one hand. The use of two of these latching mechanisms at the front and rear of the panel repectively for allowing either the front or the rear of the panel to be opened was not desirable since the additional latching mechanism substantially increased the cost of the sunroof.

Another shortcoming of prior art sunroof designs involves the fact that the sunroof panel possessed only a single open position, whereas a plurality of open positions is desirable to permit regulation of air flow through the sunroof opening.

Still another problem with prior sunroof designs relates to difficulty in completely removing the sunroof panel when it was desired to totally open the sunroof; the complexity of previous latching mechanisms required considerable time in manipulation and positioning of the roof panel to effect removal thereof.

DISCLOSURE OF THE INVENTION

The present invention provides a removable sunroof which overcomes each of the deficiencies mentioned above which is not only reliable in operation but is simple in design and therefore economical from a manufacturing standpoint.

The sunroof assembly of the present invention includes a frame extending around the periphery of an opening in the roof of a vehicle. A compressible seal captively held within a channel in the frame extends around the periphery of the opening and sealingly engages a sunroof panel adapted to overlie the opening. Front and rear spaced apart latching mechanisms allow removable mounting of the panel on the frame. The latching mechanisms each include a lever handle mounted on the panel which is received by, and latched within, a latching assembly mounted on the frame. Spring loaded, releasable latching members are received within depressions in the lever handles to allow either or both of the front and rear of the panel to be latched in an open position. The panel functions as either an air scoop or vent depending upon the state of operation of the front and rear latching mechanisms. The entire panel may be latched in an elevated position above the roof, or may be completely removed from the roof as desired.

The frame includes a first section overlying the roof, and second and third sections disposed below the roof and forming a channel within which the seal is received; a pair of opposed grooves in the second and third frame sections captively hold a pair of ribs extending outwardly from the seal, thereby to securely hold the seal on the frame.

An air deflector assembly comprising a planar deflection member is pivotally mounted adjacent the leading edge of the frame and in spaced relationship thereto. Double pivotal mounting of the deflection member permits adjustment of both the inclination and elevation of the deflection member thereby to prevent wind buffeting effects and/or deflect air through the sunroof opening into the vehicle.

Further features of the invention will become clear or will be made apparent during the course of the following description of a preferred embodiment of the invention.

BRIEF DESCRIPTION OF THE DRAWINGS

In the drawings which form an integral part of the specification and are to be read in conjunction therewith, and in which like components are designated by identical reference numerals in the various views.

DESCRIPTION OF THE PREFERRED EMBODIMENT

Referring now to the drawings, the present invention broadly relates to a sunroof assembly 20 adapted to be installed within a rectangular shaped opening 26 in the roof 22 of a vehicle 24. The sunroof assembly 20 includes a molding assembly 28 circumscribing the perimeter of the opening 26 and includes a frame 30.

Figures 6, 10, 11:
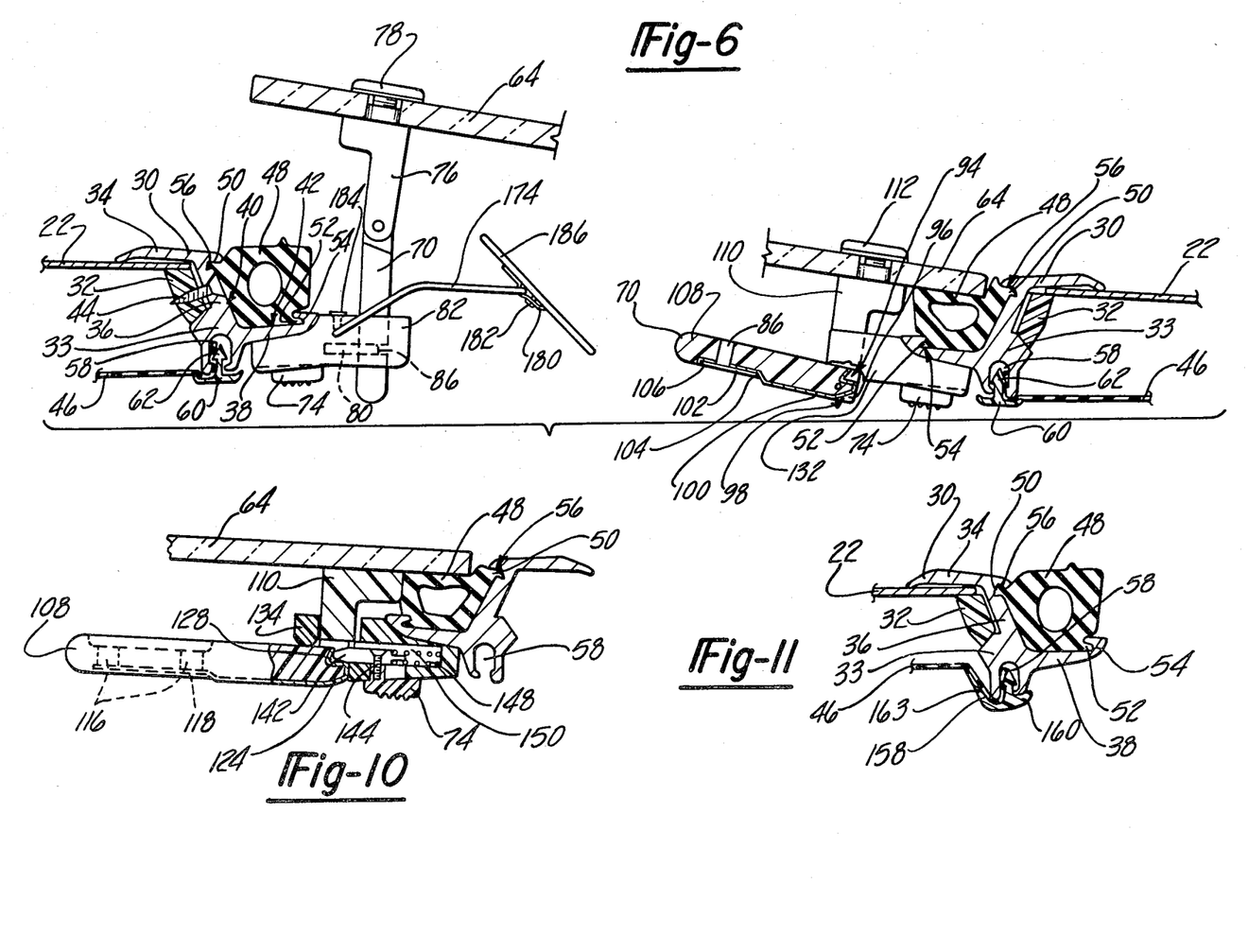
FIG. 6 is a sectional view taken along the line 6—6 in FIG. 5.
FIG. 10 is a cross-sectional view similar to FIG. 9 but showing the rear mounting means in a closed, latched position.
FIG. 11 is a cross-sectional view through the molding assembly depicting an alternate form of the headliner retainer.

Frame 30 comprises a first essentially planar section 34 disposed in overlying relationship to the periphery of the roof 22 surrounding opening 26, and further includes second and third sections 36 and 38 respectively disposed below roof 22. The second section 36 includes a surface 40 which extends downwardly away from first section 34 and inwardly into the opening 26. The third section 38 is provided with a surface 42 contiguous to surface 40 which extends away from the latter into the opening 26. Second and third sections 36 and 38 are provided with a pair of corresponding, V-shaped grooves 56 and 54 for captively holding a pair of ribs 50 and 52 respectively of a compressible, resilient seal 48 which extends around the periphery of the opening 26 and conformingly engages surfaces 40 and 42.

A retaining strip 32 of substantially rigid material is wedge-shaped in cross section and is operative to clamp the periphery of the roof 22 surrounding opening 26 against the interior surface of the first section 34 of the frame 30 by means of screws 44 extending through the second section 36. The retaining strip 32 extends continuously essentially the entire length of each side of the frame 30.

Frame 30 further includes structure 33 adjacent the juncture of second and third sections 36 and 38 provided with a slot 58 therein extending around the frame 30 for receiving an arrow-shaped leg 62 of a T-shaped headliner retainer strip 60. Retainer strip 60 is operative to clamp the periphery of a headliner 46 surrounding the opening 26 against the frame 30 to provide a clean finished appearance of the sunroof installation within the vehicle 24.

Figure 5:
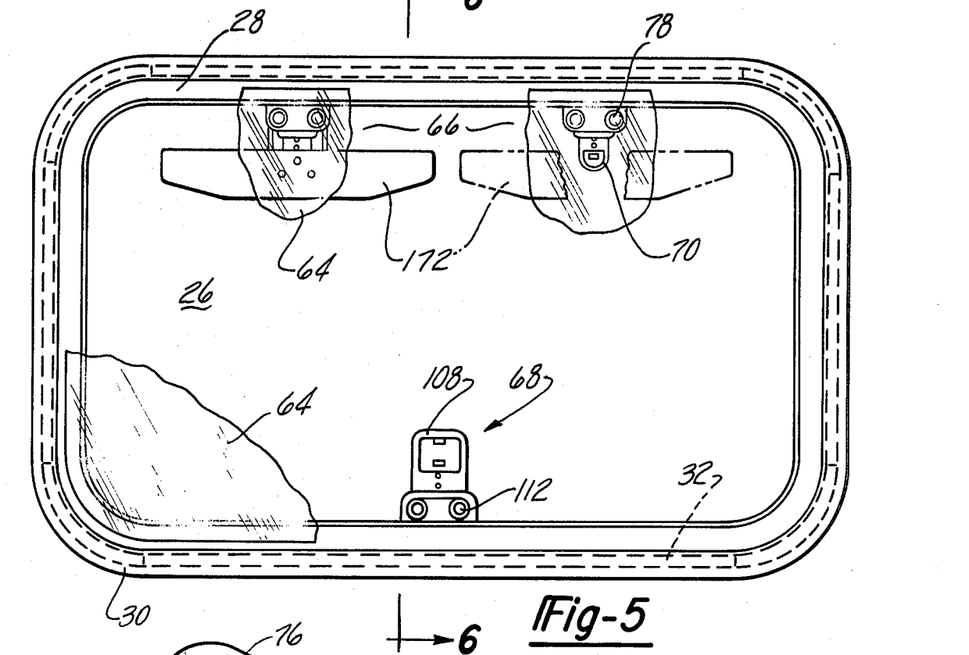
FIG. 5 is an enlarged, plan view of the sunroof shown in FIG. 1, parts of the sunroof panel being broken away to reveal the front and rear mounting means.

A sunroof panel 64, which may be of opaque or transparent material, such as glass, is adapted to overlie the sunroof opening 26 and engages the upper surface of seal 48. Panel 64 is mounted to the molding assembly 28 by a pair of spaced apart, front mounting means 66 disposed along the leading edge of frame 30, and rear mounting means 68 centrally located along the rear edge of frame 30.

Figures 7, 8:
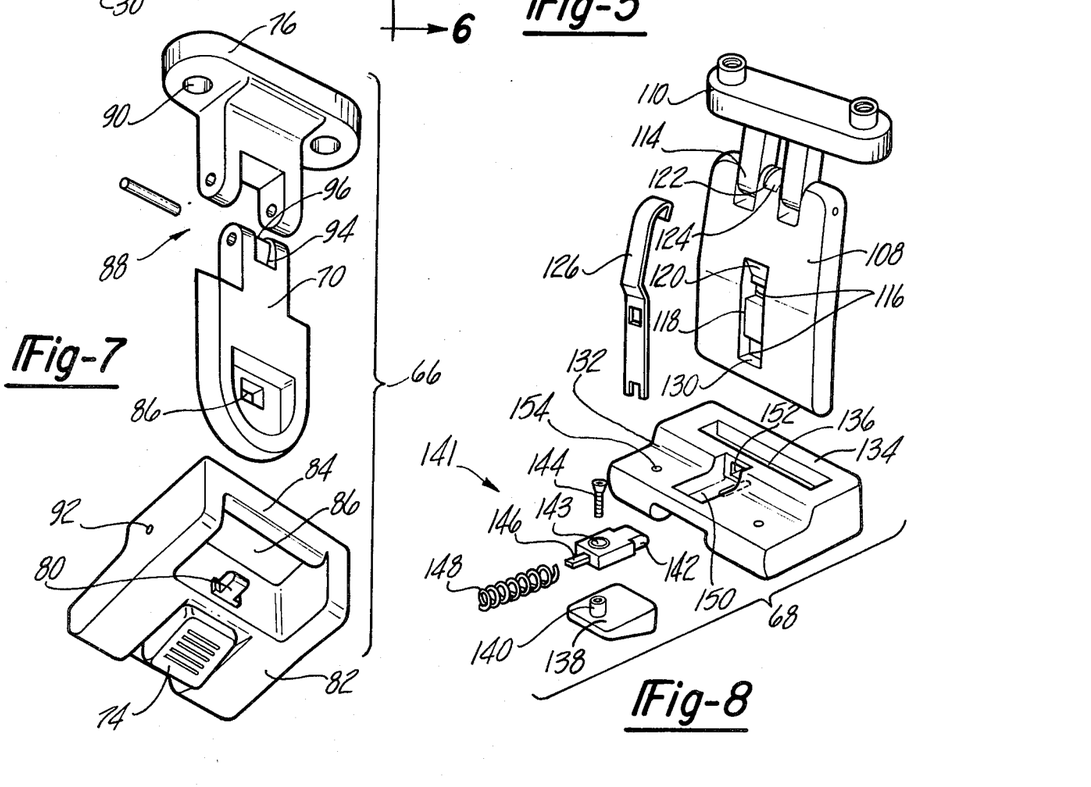
FIG. 7 is an exploded perspective view of one of the front mounting means.
FIG. 8 is an exploded perspective view of the rear mounting means.

Each of the front mounting means 66 comprises a latching mechanism including a tongue-shaped lever handle 70 and a latching mechanism 82. Lever handle 70 has one end thereof mounted by means of a pin and clevis 88 to a mounting block 76. Mounting block 76, in turn is provided with a pair of apertures 90 for receiving corresponding screws 78 which secure the mounting block 76 within apertures along the leading edge of panel 64. Lever handle 70 includes a guide groove 96 on one side thereof which extends around one end of lever handle 70 and into communication with a notch 94 in the opposite side of such handle 70. Lever handle 70 also includes a depression in the nature of a latching hole 86 therethrough in spaced relation to the pin and clevis 88. A latching guide slot 102 in one side of handle 70 communicates with hole 86 and is longitudinally aligned with the guide groove 96. One end of slot 102 adjacent guide groove 96 terminates in a ramp 104, while the other end thereof extends essentially perpendicular to the length of slot 102, thereby to define a stop 106. The lever handle 70 may be made of rigid plastic material, in which case a metal insert 100 is provided which extends from the notch 94, through guide groove 96, thence through slot 102 to prevent wear on handle 70 by a later discussed latching member.

The latching assembly 82 comprises a latching block 72 which is secured to the underside of frame 30 by means of screws extending through the third section 38 of frame 30 into latching block 72. Latching block 72 includes an opening 86 therein aligned with the vertical path of travel of lever handle 70 and defines a pivot bar 84. A latching member 80 extends through an aperture in the latching block 72 into the opening 86 and is biased into sliding engagement with the lever handle 70 by means of a later discussed spring. Latching member 80 may be shifted away from lever handle 70 into a slot within block 82 by means of a release button 74.

Figures 9, 12, 13, 14:
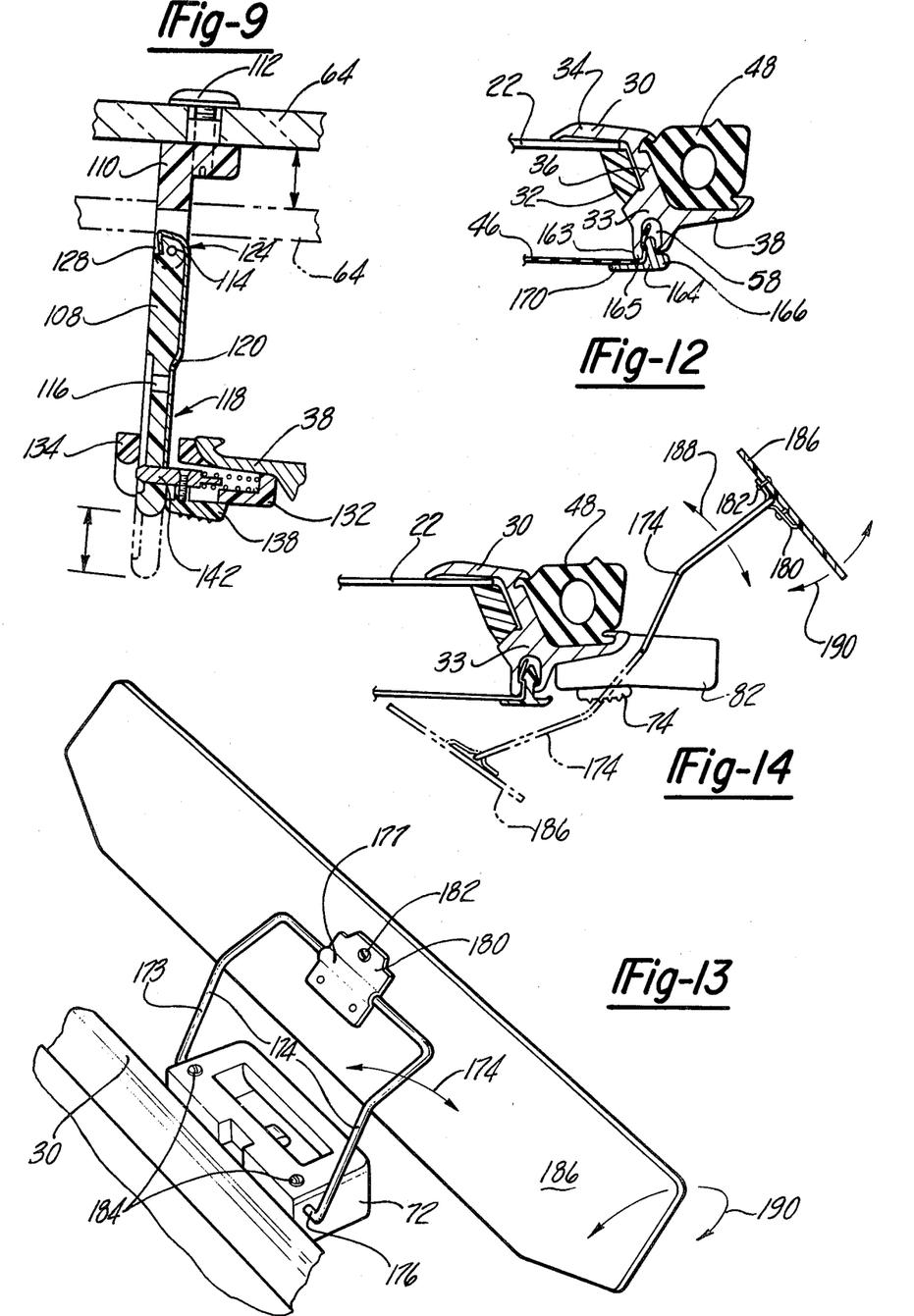
FIG. 9 is a cross-sectional view taken through the rear mounting means, showing the roof panel and lever handle in their open, latched position of maximum elevation, the intermediate open, latched position thereof being indicated in the phantom.
FIG. 12 is a view similar to FIG. 11 but showing still another form of the headliner retainer.
FIG. 13 is a fragmentary, perspective view of the air deflection assembly, showing the air deflector in an elevated position above the sunroof opening.
FIG. 14 is a side elevational view of the deflector assembly shown in FIG. 13, an alternate position of the deflector member being shown in the phantom.

The rear mounting means 68, as best seen in FIGS. 8 and 9, comprises a latching member quite similar to the front mounting means 66 shown in FIG. 7. The rear mounting means 68 includes a lever handle 108 pivotally connected by a pin and clevis 114 to a mounting block 110, which is in turn secured to the panel 64 by means of screws 112. Lever handle 108 includes a notch 128 on one side thereof adjacent the pin and clevis 114, as well as a guide groove 122 which defines an arcuately-shaped camming surface 124 on the other side of handle 108 which extends around one end thereof and communicates with notch 128. Handle 108 also includes a pair of depressions in the nature of spaced apart latch holes 116 which are aligned with guide groove 122 as well as a slot 118 which connects the latch holes 116. Slot 118 is provided with a ramp surface 120 at one end thereof adjacent guide grooves 122, and a stop 130 at the opposite end thereof immediately adjacent the free extremity of handle 108. Handle 108 is slightly wider than handles 70.

A latching assembly 141 which is essentially identical in construction to latching assembly 82, includes a latching block 132 having an opening 136 therein to define a pivot bar 134. Block 132 is secured to the lower surface of the frame 30 by means of screws passing through the third section 38 of frame 30 and into apertures 134 of block 132. Block 132 also includes a slot 150 terminating in an opening 152 communicating with the opening 136 for receiving a latching member 142 and associated biasing spring 148. One outer extremity of latching member 142 extends outwardly through opening 152, while the opposite extremity thereof is provided with an extension 146 adapted to allow the spring 146 to be sleeved thereover. A screw 144 passing through aperture 143 in latching member 142 is secured within an extension 140 of a release button 138, thereby to secure button 138 to latching member 142.

In use, the lever handle 108 is inserted into opening 136 of latching block 132 and release button 138 is operated to retract latching member 142 away from opening 152. As handle 108 enters opening 136, button 138 may be released whereupon latching member 142 is biased into sliding engagement with one side of handle 108. Latching member 142 slidably engages handle 108 until brought into registration with the lower latching hole 116 whereupon the latching member extends into such hole, thereby preventing movement of handle 108 relative to latching assembly 141. In the position just described, the rear of the panel 64 is latched in the uppermost, open position thereof as shown in FIG. 9. The panel 64 may be shifted to an intermediate open position by retracting the release button 138 and drawing lever handle 108 downwardly until the upper latching hole 116 registers with latching member 142; during this period of adjustment, the latching member 142 is retained within slot 118. The rear portion of panel 64 may then be closed by again retracting the latching member 142 from the upper hole 116 by means of release button 138 and drawing handle 108 downwardly; when latching member 142 clears the upper latching hole 116, button 138 may be released whereupon latching member 142 rides on the metal insert 126 into the guide groove 122. When handle 108 reaches its lowermost position relative to latching block 138, handle 108 is pivoted in a clockwise position, as viewed in FIG. 9, thereby causing one side of handle 108 adjacent the pin and clevis 114 to engage the pivot bar 134. With pivot bar 134 acting as a fulcrum for the major length of handle 108, continued pivotal movement of handle 108 causes the latching member 142 to be cammed into the notch 128 by camming surface 124, thereby positively latching handle 108 in a latched position. The lever-like action of handle 108 draws the panel 64 downwardly against the resilient force imposed thereon by the seal 48, thereby producing a weather-tight closure between panel 64 and seal 48.

To release the handle 108 from the closed, latched position, handle 108 is pivoted in a counterclockwise direction, as viewed in FIG. 9 whereupon, latching member 142 is automatically cammed over the end of guide groove 122 by camming surface 124 until handle 108 is vertically aligned with opening 136 and latching block 132. The rear portion of panel 64 may then be raised; as panel 64 is raised, latching member 142 slides within guide groove 122 and downwardly on ramp surface 120 into slot 118, thence into the upper latching hole 116. Retraction of latching member 142 by release button 138 permits further elevation of panel 64, but the stop 130 prevents inadvertent removal of handle 108 from latching block 132 unless the latching member 142 is completely retracted by release button 138 so as to clear stop 130.

The operation of each of the front mounting means 66 is essentially identical to that described with reference to the rear mounting means 68, except that only one open position is provided for the forward portion of panel 64.

From the foregoing, it may be readily appreciated that panel 64 may be disposed in a plurality of operating positions, as is depicted in FIGS. 1-4. With the rear mounting means 68 in the closed, latched position thereof, the front mounting means 66 may be operated to the open position thereof, thereby elevating the front of the panel 64 above the roof 22 to form an air scoop. Alternatively, the front mounting means 66 may remain in a closed latched condition, and the rear mounting means 68 may be operated to one of the open elevational positions thereof, thereby elevating only the rear of the panel 64 to provide a vent. It is to be noted that both the front and rear mounting means 66 and 68 respectively provide a pivotal connection between the panel 64 and the molding assembly 28 so as to allow either the front or rear of panel 64 to be pivoted when the corresponding latching means 66 or 68 is in the closed, latched position thereof.

Figure 1:
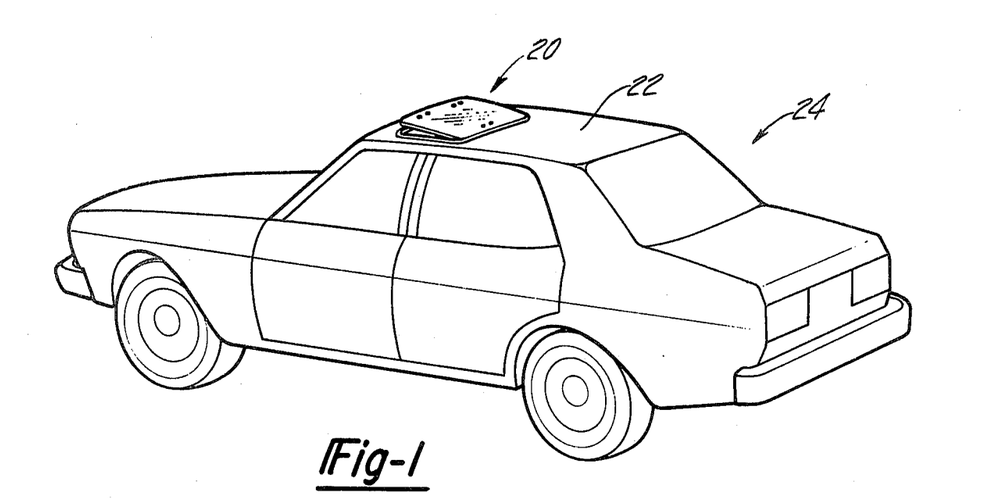
FIG. 1 is a perspective view of a vehicle having the removable sunroof which forms the preferred embodiment of the present invention installed in the roof thereof, the sunroof panel having been operated to the scoop position thereof.
Figure 2:
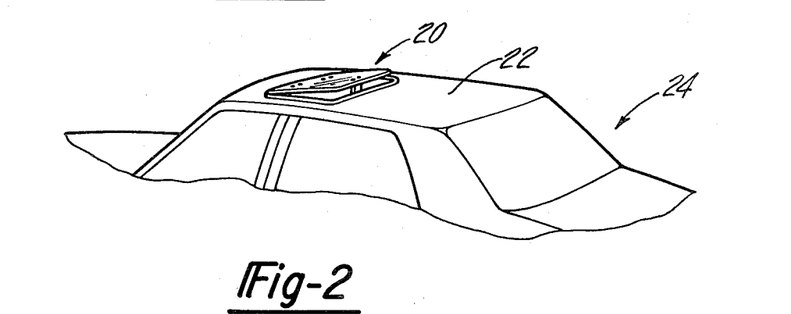
FIG. 2 is a view similar to FIG. 1 but showing the sunroof panel in the vent position thereof.
Figure 3:
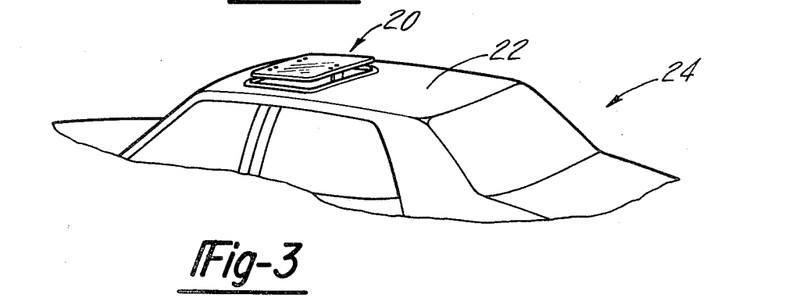
FIG. 3 is a view similar to FIGS. 1 and 2 but depicting the entire sunroof panel in an elevated position.
Figure 4:
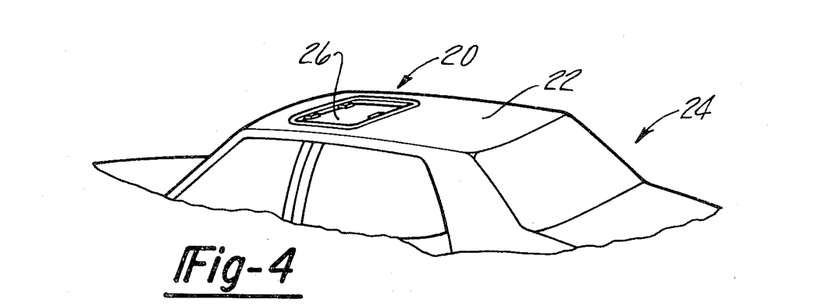
FIG. 4 is similar to FIGS. 1-3 but showing the sunroof panel removed from the vehicle.

The entire panel 64 may be elevated, if desired, as shown in FIG. 3 by operating both the front and rear mounting means 66 and 68 to the open positions thereof. Finally, the panel 64 may be completely removed from the opening 26, as shown in FIG. 4, by removing the lever handles 70 and 108 from the corresponding latching assemblies 82 and 141.

Attention is now directed to FIG. 11 wherein an alternate form of a headliner retainer 156 is depicted. Retainer 156 may comprise a strip of resilient, but relatively rigid material, as of plastic, and includes an arrow-shaped leg 158 captively held within the slot 58. A first flange 160 is disposed in overlying relationship to one side of the structure defining slot 58 adjacent the third section 38 of frame 30. A second upwardly turned flange 162 extends outwardly away from the opening 26 and upwardly toward roof 22, thereby to clamp headliner 46 against a surface 163; flange 162 maintains headliner 46 in an elevated position and may be employed in vehicles having reduced clearance between headliner 46 and roof 22.

Still another form of headliner retainer 164 is depicted in FIG. 12. Retainer 164 may be manufactured of rigid material such as metal, and includes a hook-shaped extension 168 extending into slot 58, thereby to hook an edge of the headliner 46 on a ledge 165 of the frame 30. Retainer 164 further includes a pair of oppositely extending flanges 166 and 170 beneath the hook-shaped extension 168 to form an aesthetic transition between the headliner 46 and frame.

Attention is now particularly directed to FIGS. 13 and 14 wherein a novel air deflection assembly is depicted. The deflector assembly 172 comprises a generally rectangular deflection member 186 made of rigid material such as metal or glass. Deflection member 186 may be transparent if desired, however, appropriate tinting is applied thereto whereby deflection member 186 may also function as a sun visor.

Deflection member 186 is pivotally mounted in spaced relationship to the leading edge of opening 26 by means of a U-shaped support 173 comprising a pair of essentially parallel angularly shaped rods 174 and a leg 178 connecting one set of extremities of rods 174. The opposite ends of rods 174 are provided with inwardly directed extensions 176 which are pivotally received within apertures 92 on opposite sides of latching block 72, thereby pivotally mounting the deflection member 186 for swinging movement about a first transversely extending axis for swinging movement through an angular displacement of at least 90°.

Leg 178 is captively held for pivot movement between a U-shaped trough 177 of a mounting plate 180 and the deflection member 186. The relative pressure applied to leg 178 by plate 180 may be adjusted by means of a screw 182 extending through plate 180 and into member 186, which varies the pressure applied by plate 180 to leg 178. It may be thus appreciated that mounting plate 180 mounts deflection member 186 on leg 178 for pivotal movement for almost 180° of rotation about a second transversely extending axis, spaced from the first axis mentioned above. It may be further appreciated that deflection member 186 may be pivoted about the first axis through extensions 176, and in the direction of the arrows 188 to adjust the elevation thereof relative to the roof 22. Further, deflection member 186 may be pivoted about the second axis through leg 178 to permit adjustment of the inclination thereof in the direction of the arrows 190, relative to the oncoming air flowing over roof 22.

As previously noted, deflection member 186 may be employed as a sun visor for shielding occupants of the vehicle 24 from the sun's rays passing through the opening 26. More importantly, however, the deflection member 186 may be disposed in a position similar to that shown in FIG. 13 in order to deflect a portion of the oncoming air upwardly and away from the opening, thereby to prevent buffeting of the wind within the opening 26, which is annoying to the vehicle's occupants. Finally, the deflection member 186 may be inclined as shown in FIG. 14 in order to scoop or deflect a portion of the air flowing over the roof 22 through the opening 26 into the interior of the vehicle 24. The amount of air thus deflected may be adjusted by varying either the elevation and/or the inclination of deflection member 186. When not in use, deflection member 186 may be pivoted downwardly and forwardly into adjacency with the headliner 46, out of the view of the driver or other occupants.

It is to be noted that the deflection assembly 172 may be advantageously employed in combination with the sunroof assembly 20 previously described if desired. For example, the forward portion of the panel 64 may be elevated to act as a scoop, and the deflection member 186 may be positioned adjacent the opening between the panel 64 and roof 22 in order to direct the incoming air to a desired location within the interior of the vehicle 24. It is to be noted that the ease with which the rods 173 may be pivoted about latching block 72 may be adjusted by means of set screws 184 which bear against extensions 176.

From the foregoing, it can be appreciated that the movable sunroof described above not only provides for the reliable accomplishment of the objects of the invention, but does so in a particularly effective and economical manner. It is recognized, of course, that those skilled in the art may make various modifications or additions to the preferred embodiment chosen to illustrate the invention without departing from the scope and spirit of the present contribution to the art. Accordingly, it is to be understood that the protection sought to be afforded hereby should be deemed to extend to the subject matter claimed and all equivalents thereof fairly within the scope of the invention.

What is claimed is:

1. A molding assembly for use in framing the perimeter of an opening formed in a roof sheet of a vehicle to adapt said opening to receive a removeable sunpanel, comprising:
   a first generally planar section adapted to overlay the top of said roof sheet surrounding the perimeter of said opening;
   a second section having a first surface extending downwardly and away from said first section at an oblique angle relative to said first section;
   retaining means adapted to be inserted between said first and second sections for clamping said roof sheet against said first section;
   a third section disposed below the roof sheet and having a second surface contiguous with said first surface and extending inwardly and away from the perimeter of said opening, said first and second surfaces defining a channel, said second and third sections including a pair of opposed grooves in said first and second surfaces respectively; and
   a resilient seal within said channel adapted to conformingly engage said first and second surfaces, said seal including a pair of outwardly extending ribs respectively captively held within said grooves for retaining said seal in said channel.

2. The molding assembly of claim 1, including structure contiguous with at least one of said second and third sections and provided with a slot therein adapted to receive the free edge of a fabric headliner beneath said roof sheet.

3. The molding assembly of claim 1, wherein said opposed grooves are each V-shape in cross section.

4. The molding assembly of claim 1, wherein said retaining means comprises a plurality of elongate, substantially rigid, wedge shaped members respectively associated with each side of said opening, each of said members extending continuously along substantially the entire length of the corresponding side of said opening to continuously support said roof sheet around the perimeter of said opening.

5. A sunroof assembly for a vehicle having an opening in the roof thereof, comprising:
   a frame extending around the periphery of said opening;
   a compressible seal on said frame and extending around the periphery of said opening;
   a sunroof panel adapted to overlie said opening in sealing engagement with said seal; and,
   front and rear, spaced apart means for removeably mounting said panel on said frame and each including latch means for latching the front and rear of said panel in an open, elevated position above said roof, and for pivotally mounting said front and rear of said panel whereby said front and rear of said panel may be selectively elevated or pivoted.

6. A sunroof assembly for a vehicle having an opening in the roof thereof, comprising:
   a frame extending around the periphery of said opening;
   a compressible seal on said frame and extending around the periphery of said opening;
   a sunroof panel adapted to overlie said opening in sealing engagement with said seal; and,
   front and rear, spaced apart means for removeably mounting said panel on said frame and each including latch means for latching the front and rear of said panel in an open, elevated position above said roof, said rear mounting means including a first lever handle having at least one depression therein corresponding to an open position of the rear of said panel, and a first latching assembly having a latch member selectively extensible into said one depression.

7. The sunroof assembly of claim 6, wherein said first lever handle is mounted on said panel and said first latching assembly is mounted on said frame.

8. The sunroof assembly of claim 7, wherein said first lever handle includes a plurality of said depressions therein each corresponding to a different open elevated position of the rear of said panel, said lever handle further including a slot therein extending between said depressions and being of lesser depth than said depressions for receiving and guiding said latching member therein.

9. The sunroof assembly of claim 8, wherein one extremity of said slot includes a surface extending essentially perpendicular to the direction of said slot and defining a stop for engaging said latching member to prevent inadvertent disengagement of said lever handle from said first latching assembly.

10. The sunroof assembly of claim 9, wherein the opposite extremity of said slot includes a ramp surface for slidably camming said latching member to retract when the rear of said panel is shifted from an open to a closed position.

11. The sunroof assembly of claim 7, wherein said first lever handle is pivotally connected to said panel, and said first latching means includes a pivot bar defining a fulcrum about which said first lever handle may be pivoted from a released position to a locked position to urge said panel downwardly into sealing engagement with said seal.

12. The sunroof assembly of claim 11, wherein said first latching assembly further includes:
   a latching block having said pivot bar connected thereto, said latching member being slidably mounted on said latching block for sliding movement toward and away from said first lever handle,
   means on said latching block for biasing said latching member toward said first lever handle, and
   manually operable means connected to said latching member for shifting the latter away from said first lever handle against the influence of said biasing means.

13. The sunroof assembly of claim 11, wherein said first lever handle includes:
   a guide groove on one side thereof within which said latching member may be received and extending around one end of said first lever handle,
   an arcuate camming surface within said groove for engaging said latching member, and
   a notch in the other side of said first lever handle communicating with said guide groove and receiving and captivating said latch member when said first lever handle is pivoted to said locked position thereof.

14. The sunroof assembly of claim 13, wherein said first lever handle comprises plastic material and there is further provided a metal insert covering said camming surface and said notch for preventing wear of said plastic material.

15. The sunroof assembly of claim 6, wherein said front mounting means comprises a second and third lever handle each having a depression therein corresponding to an open position of the front of said panel, and second and third latching assemblies respectively associated with said second and third lever handles and each having a latching member selectively extensible into one of the depressions of said second and third lever handles for maintaining the front of said panel in said open position thereof.

16. The sunroof assembly of claim 15, wherein said second and third lever handles are each pivotally mounted on said panel, and said second and third latching assemblies are mounted on said frame.

17. The sunroof assembly of claim 15, wherein said second and third latching assemblies each include a pivot bar defining a fulcrum about which the corresponding lever handle may be pivoted from a released position to a locked position, whereby to urge the forward portion of said panel downwardly into sealing engagement with said seal.

18. A sunroof assembly for a vehicle having an opening in the roof thereof, comprising:
   a frame extending around the periphery of said opening;
   a compressible seal on said frame and extending around the periphery of said opening;
   a sunroof panel adapted to overlie said opening in sealing engagement with said seal; and,
   front and rear, spaced apart means for removeably mounting said panel on said frame and each including latch means for latching the front and rear of said panel in an open, elevated position above said roof, said frame including
   (1) a first generally planar section adapted to overlie the top of said roof surrounding the perimeter of said opening,
   (2) a second section having a first surface extending downwardly and away from said first section at an oblique angle relative to said first section, and
   (3) a third section disposed below said roof and having a second surface contiguous with said first surface extending inwardly and away from the perimeter of said opening, said first and second surfaces defining a channel, said second and third sections including a pair of opposed grooves in said first and second surfaces respectively, said compressible seal being disposed within said channel and conformingly engaging said first and second surfaces, said seal extending into said opposed grooves whereby to be held by said grooves within said channel.

19. The sunroof assembly of claim 18, further including a substantially rigid, elongate retaining member having a substantially wedge shaped cross section inserted between said first and second sections to clamp said roof between first section and said retaining member, said retaining member extending continuously along substantially the entire length of each side of said frame.

20. A sunroof assembly for a vehicle having an opening in the roof thereof, comprising:
   a frame extending around the periphery of said opening;
   a compressible seal on said frame and extending around the periphery of said opening;
   a sunroof panel adapted to overlie said opening in sealing engagement with said seal;
   front and rear, spaced apart means for removeably mounting said panel on said frame and each including latch means for latching the front and rear of said panel in an open, elevated position above said roof;
   substantially planar, air deflecting means extending transversely relative to said roof for deflecting air flowing across said roof through said opening; and,
   mounting means pivotally connecting said deflecting member in spaced relationship to the forward edge of said opening for pivotal movement about first and second transversely extending spaced apart axes.

21. The sunroof assembly of claim 20, wherein said mounting means comprises a pair of elongate, spaced apart support members, each having one extremity thereof pivotally connected to said front mounting means.

22. A molding assembly for use in framing the perimeter of an opening formed in a roof sheet of a vehicle to adapt said opening to receive a removable sunroof panel, comprising:
   a first generally planar section adapted to overlay the top of said roof sheets surrounding the perimeter of said opening;
   a second section having a first surface extending downwardly away from said first section at an oblique angle relative to said first section;

a third section disposed below the roof sheet and having a second surface contiguous with said first surface extending inwardly and away from the perimeter of said opening, said first and second surfaces defining a channel;

a resilient seal within said channel adapted to engage said sunroof panel;

a fourth section adjacent the juncture of said first and second sections and including a slot therein extending around the perimeter of said opening, said slot including a ledge therewithin extending in a direction generally away from said third section; and a retainer strip extending around the perimeter of said opening, said retainer strip including a first portion adapted to underlap the perimeter of a headliner beneath said roof sheet and a second portion extending upwardly away from said first portion and terminating in a hook-shaped configuration within said slot, said hook-shaped configuration being adapted to overlie said ledge within said slot, the edge of said headliner being wedged between said hook-shaped configuration and said ledge whereby to retain the edge of said headliner within said fourth section.

23. The molding assembly of claim 22, wherein said first portion of said retaining strip extends laterally on opposite sides of said slot, and said second portion is spaced from one sidewall side defining said slot.

24. The molding assembly of claim 22, wherein said first portion extends essentially perpendicular to said second portion.

25. For use with a sunroof assembly for a vehicle, including a frame extending around the periphery of an opening in the roof of said vehicle and a sunroof panel adapted to overlie said opening, an assembly for mounting at least one edge of said panel on said frame comprising:

a lever handle pivotally connected to said panel and adapted to be pivoted from an operating position extending essentially perpendicular to said panel to a locked position away from the perimeter of said opening and into underlying relationship to said panel;

a latching assembly on said frame and including an opening vertically aligned with said handle when the latter is in said operating position thereof for receiving said handle therethrough, a pivot bar adjacent said opening against which said handle may be pivoted when the latter is pivoted from said operated position thereof to said locked position thereof, and means for selectively engaging said handle to maintain said handle in said locked position thereof.

26. The assembly of claim 25, wherein said handle is provided with a notch therein and said latching assembly includes a shiftable latching member and means for biasing said latching member into said notch of said handle.

27. The assembly of claim 26, wherein said handle further includes at least one latch opening therein between said notch and a free outer extremity of said handle, said latch opening being adapted to receive said latch member therewithin to latch said one edge of said panel in an elevated position above said roof.

28. The assembly of claim 27, wherein said handle includes at least one guide slot therein for receiving said latching member therewithin, said guide slot extending between said notch and said free outer extremity of said handle.

29. The assembly of claim 26, wherein said latching assembly further includes a pivot block stationarily mounted on said frame and having said pivot bar formed integral therewith, said latching member being slidably mounted on said latching block, said latching assembly further including manually operable means connected to said latching member for urging the later away from said handle whereby to release the latter for shifting within said opening.

* * * * *